Patented Aug. 27, 1929.

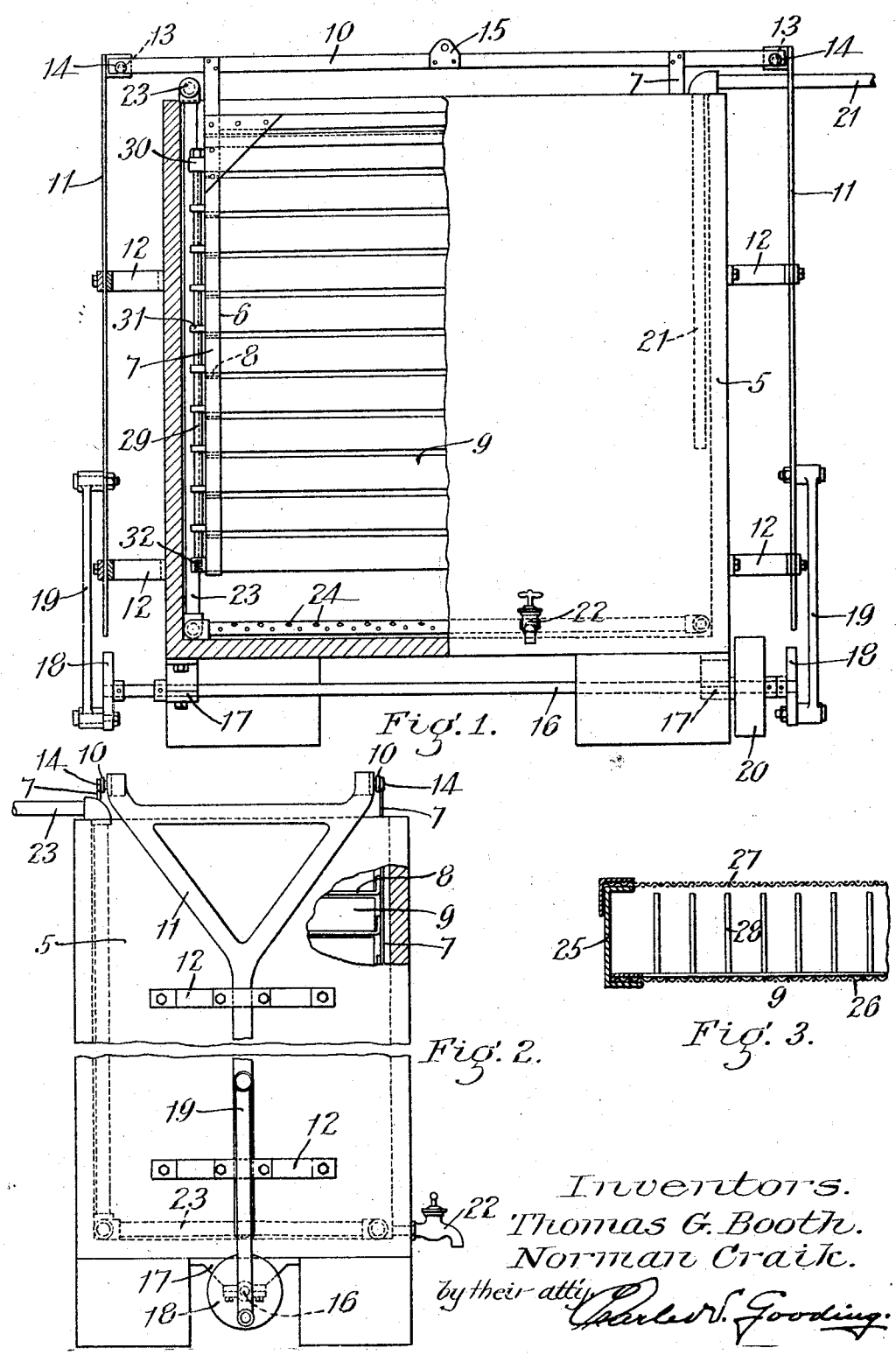

1,726,381

UNITED STATES PATENT OFFICE.

THOMAS G. BOOTH AND NORMAN CRAIK, OF BOSTON, MASSACHUSETTS.

WASHING APPARATUS.

Application filed December 13, 1927. Serial No. 239,788.

This invention relates to a washing apparatus and particularly to an apparatus for washing vegetable fibers such as are obtained from the stalks of flax, hemp, ramie, sisal, and similar fiber yielding plants.

In separating the fibers or fiber yielding plants from the stalks of which they form a part, the stalks are first treated in a machine which crushes and bends the stalks and manipulates the same in a manner to loosen the fibers and break and separate therefrom the woody boon which comprises a greater portion of the stalk. After being subjected to this treatment, however, there still remains clinging to the fibers, small particles of a gumy substance and also a considerable quantity of the broken particles of boon, both of which must be removed before the fibers can be used commercially.

The object of this invention is to provide an efficient apparatus for washing the material as it is delivered from the machine above mentioned, thereby freeing the fibers of the particles of gum and boon which are clinging thereto.

The invention consists in a washing apparatus as set forth in the following specification and particularly as pointed out in the claim thereof.

Referring to the drawings:

Figure 1 represents a partial front elevation and partial vertical section of a washing apparatus embodying our invention.

Fig. 2 is a side elevation of the apparatus as viewed from the left of Fig. 1.

Fig. 3 is an enlarged detail sectional view of a portion of a tray.

Like numerals refer to like parts throughout the several views of the drawings.

In the drawings, 5 represents a tank of any suitable construction and adapted to hold a quantity of washing fluid preferably composed of water and washing powder, which is free from either acid or alkali. Located within the tank 5 is a frame 6 embodying therein a pair of side members 7, to which are rigidly fastened a plurality of supports 8 for trays 9. The tray supports 8 are located parallel to each other upon opposite sides of the frame 6 and when the trays 9 are in position thereon, the top edges of said trays are located very close to the under surface of the supports located immediately thereabove. The side members 7 are each rigidly secured to bars 10 which are detachably secured at their opposite ends to Y-shaped supports 11 mounted to slide vertically in brackets 12 fastened to opposite sides of the tank 5. The frame 6 is so constructed that it may be lifted from the supports 11, there being slots 13 formed adjacent to the opposite ends of the bars 10, and pins 14 projecting from the supports 11 project inside these slots. A lifting plate 15 is fastened to each of the bars 10 and any suitable form of lifting or hoisting device may be attached to these plates when it is desired to lift the frame from within the tank 5.

A vertical reciprocatory motion is imparted to the frame 6 by a shaft 16 mounted in bearings 17, in turn mounted in any suitable manner upon the tank 5. Cranks 18 are rigidly fastened to the shaft 16 at opposite ends thereof and said cranks are operatively connected to the supports 11 by means of connecting rods 19. The shaft 16 is driven by a pulley 20.

Fresh water is delivered to the tank through a pipe 21 and the washing fluid is withdrawn from the tank through a faucet 22. The washing fluid is preferably maintained at a temperature ranging from 150° to 175° by admitting steam to said washing fluid through a pipe 23, which discharges said steam at the bottom of the tank beneath the lower tray 9 through openings 24 provided in said pipe.

The trays 9, in which the material to be washed is placed, preferably have solid side walls 25 and a perforated bottom 26, constructed of wire fabric. The top tray is provided with a perforated cover 27, but trays located beneath the uppermost tray all utilize the tray located immediately thereabove as a cover. Each tray is provided with rows of vertical pins 28, between which the material is located.

When the trays 9 are all located in position upon the frame 6, they are held in position upon said frame by means of rods 29, one of which is located at each side of the tier of trays. Each rod 29 projects downwardly through a lug 30 provided in the uppermost tray and through lugs 31 provided upon each of the intermediate trays and to a lug 32 upon the lowermost tray, and the rod preferably has screw-threaded engagement with the lug 32 and may be tightened in a manner to clamp the uppermost and lowermost trays to the frame 6.

The general operation of the apparatus hereinbefore specifically described is as follows:—Assuming that the frame 6 has been withdrawn from the tank 5, the trays 9 are filled with the fibrous material, and said trays are placed one above the other within said frame, each tray resting upon the supports 8. The rods 29 are then applied to the trays in a manner to clamp the uppermost and lowermost trays to the frame 6 and at the same time hold the intermediate trays against any sideways movement within said frame. The frame 6 is then lowered into the tank and the bars 10 will rest loosely upon the pins 14 of the supports 11. When the shaft 16 is rotated, a vertical reciprocatory motion is imparted to the frame 6; and the trays 9 which are located upon said frame are agitated within the washing fluid for a sufficient period of time to remove from the fibers the small particles of gum and boon which have been clinging thereto. During the period that the material is being washed the washing fluid is maintained at a temperature of from 150° to 175° by discharging steam into the tank adjacent to the bottom thereof. The washing fluid is finally withdrawn through the faucet 22 and the fibers are finally rinsed in fresh water. The particles of gum and boon which have been washed from the fibers are removed from the tank and after being separated may be employed to advantage commercially.

We claim:—

A washing apparatus of the character described having, in combination, a tank for washing fluid, Y-shaped supports slidably mounted upon the exterior of said tank and embodying therein branching arms, a frame within the tank and supported loosely upon said arms, a plurality of trays for the material to be washed mounted upon said frame and removable therefrom at a side thereof, means to position and hold said trays upon the frame, and means to impart a vertical reciprocatory motion to the supports, whereby the trays are agitated within the tank.

In testimony whereof we have hereunto set our hands.

THOMAS G. BOOTH.
NORMAN CRAIK.